United States Patent
Castelli et al.

(10) Patent No.: US 10,916,129 B2
(45) Date of Patent: Feb. 9, 2021

(54) ROADWAY CONDITION PREDICTIVE MODELS

(71) Applicant: International Business Machines Corporation, Armonk, NY (US)

(72) Inventors: Vittorio Castelli, Croton On Hudson, NY (US); Martin Franz, Yorktown Heights, NY (US); Gourab Kundu, White Plains, NY (US); Taesun Moon, Scarsdale, NY (US); Avirup Sil, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 15/418,839

(22) Filed: Jan. 30, 2017

(65) Prior Publication Data

US 2018/0218596 A1 Aug. 2, 2018

(51) Int. Cl.
*G08G 1/09* (2006.01)
*G08G 1/01* (2006.01)
(Continued)

(52) U.S. Cl.
CPC ......... *G08G 1/0145* (2013.01); *G08G 1/0112* (2013.01); *G08G 1/0116* (2013.01);
(Continued)

(58) Field of Classification Search
CPC .... G08G 1/012; G08G 1/0125; G08G 1/0145; G08G 1/093; G08G 1/096844;
(Continued)

(56) References Cited

U.S. PATENT DOCUMENTS

| 7,203,579 | B2 * | 4/2007 | Yokota | B60C 23/0477 |
| | | | | 303/150 |
| 7,437,250 | B2 * | 10/2008 | Breen | E01C 23/00 |
| | | | | 404/17 |

(Continued)

FOREIGN PATENT DOCUMENTS

JP PCT/JP2014/071411 * 8/2014 ............. G01D 11/30

OTHER PUBLICATIONS

Fully Automated Road Defect Detection Using Street View Images; David B. Abou Chacra ; John S. Zelek; 2017 14th Conference on Computer and Robot Vision (CRV); IEEE Conference Paper. (Year: 2017).*

(Continued)

*Primary Examiner* — Cuong H Nguyen
(74) *Attorney, Agent, or Firm* — Law Office of Jim Boice (57) ABSTRACT

A roadway condition predictive model that can recommend ameliorative roadway action(s) is disclosed. A roadway controller computer acquires sensor and location information, which describe physical driving surface conditions on the roadway, from a plurality of vehicles that travel on the roadway. The roadway controller computer also acquires environmental and traffic conditions for the roadway. The roadway controller computer creates a predictive model that describes a deterioration rate and future physical condition of the roadway, based on the acquired sensor, location information, environmental and traffic conditions for the roadway. The roadway controller computer then implements an action to ameliorate deterioration of the roadway that is predicted by the predictive model.

12 Claims, 5 Drawing Sheets

(51) Int. Cl.
| | | |
|---|---|---|
| *G08G 1/0968* | (2006.01) | |
| *H04L 29/08* | (2006.01) | |
| *H04W 76/10* | (2018.01) | |
| *G08G 1/0967* | (2006.01) | |

(52) U.S. Cl.
CPC ..... *G08G 1/0129* (2013.01); *G08G 1/096716* (2013.01); *G08G 1/096741* (2013.01); *G08G 1/096775* (2013.01); *G08G 1/096811* (2013.01); *G08G 1/096844* (2013.01); *H04L 67/10* (2013.01); *H04L 67/12* (2013.01); *H04L 67/18* (2013.01); *H04W 76/10* (2018.02)

(58) Field of Classification Search
CPC ........ G08G 1/096883; G08G 1/096888; H04L 67/12; H04W 76/02; H04W 76/10
USPC .................................................. 701/31.4, 117
See application file for complete search history.

(56) References Cited

U.S. PATENT DOCUMENTS

| | | | | |
|---|---|---|---|---|
| 7,912,628 | B2* | 3/2011 | Chapman | G01C 21/3691 701/117 |
| 8,766,817 | B2 | 7/2014 | Sri-Jayantha | |
| 8,831,869 | B2 | 9/2014 | Bai et al. | |
| 9,079,461 | B2* | 7/2015 | Suh | B60C 23/02 |
| 9,187,099 | B2* | 11/2015 | Powers | B60W 40/06 |
| 9,384,597 | B2* | 7/2016 | Koch | G07C 5/008 |
| 9,965,952 | B2* | 5/2018 | Abraham | G08G 1/0967 |
| 10,048,700 | B1* | 8/2018 | Curlander | G08G 1/164 |
| 10,388,844 | B2* | 8/2019 | Kurihara | G01F 23/0076 |
| 2004/0107042 | A1 | 6/2004 | Seick | |
| 2005/0085987 | A1* | 4/2005 | Yokota | B60C 23/0477 701/80 |
| 2006/0036378 | A1* | 2/2006 | Smith | E01C 23/00 702/57 |
| 2008/0071465 | A1* | 3/2008 | Chapman | G01C 21/3691 701/117 |
| 2013/0261939 | A1* | 10/2013 | McQuade | F02D 29/02 701/110 |
| 2013/0261942 | A1* | 10/2013 | McQuade | F02D 29/02 701/115 |
| 2014/0277902 | A1* | 9/2014 | Koch | G07C 5/008 701/29.1 |
| 2014/0277910 | A1* | 9/2014 | Suh | B60C 23/02 701/31.4 |
| 2015/0166072 | A1* | 6/2015 | Powers | B60W 40/06 701/1 |
| 2015/0221221 | A1 | 8/2015 | Schaefer et al. | |
| 2015/0251667 | A1 | 9/2015 | Lu et al. | |
| 2016/0093210 | A1 | 3/2016 | Bailey et al. | |
| 2016/0275404 | A1* | 9/2016 | Abraham | G06Q 10/20 |
| 2017/0222115 | A1* | 8/2017 | Kurihara | H04Q 9/00 |
| 2018/0111618 | A1* | 4/2018 | Morimoto | B60W 20/00 |

OTHER PUBLICATIONS

Using Artificial Intelligence for Block Maintenance of Pavement Segments with Similar Degradation Profile; Soumaya Yacout ; Mohamed Salah Ouali; 2019 Annual Reliability and Maintainability Symposium (RAMS); IEEE Conference Paper. (Year: 2019).*

Toward Safer Highways: Predicting Driver Stress in Varying Conditions on Habitual Routes; Victor Corcoba Magana ; Mario Munoz-Organero; IEEE Vehicular Technology Magazine; vol. 12, Issue: 4; IEEE Magazine Article. (Year: 2017).*

Ego-lane estimation for downtown lane-level navigation; Johannes Rabe ; Martin Hübner ; Marc Necker ; Christoph Stiller; 2017 IEEE Intelligent Vehicles Symposium (IV); IEEE Conference Paper. (Year: 2017).*

P. Mell et al., "The NIST Definition of Cloud Computing", National Institute of Standards and Technology, Information Technology Laboratory, Sep. 2011, pp. 1-7.

Anonymous, "A Method and System for Predicting, Alerting and Proposing Corrective Actions to Avoid Road Hazards". IPCOM000244795D, Jan. 15, 2016.

Madli et al., "Automatic Detection and Notification of Potholes and Humps on Roads to Aid Drivers". IEEE Sensors Journal, vol. 15, No. 8, Aug. 2015, pp. 4313-4318.

* cited by examiner

ROADWAY CONDITION PREDICTIVE MODELS

BACKGROUND

The present disclosure relates generally to the field of roadway sensors and more specifically to the field of roadway condition predictive models.

SUMMARY

In an embodiment of the present invention, a computer-implemented method ameliorates deterioration of a roadway using a roadway condition predictive model. The computer-implemented method includes, a roadway controller computer acquiring sensor and location information, which describes physical driving surface conditions on the roadway, from a plurality of vehicles that travel on the roadway. The roadway controller computer also acquires (real-time and/or historical) environmental and traffic conditions for the roadway. The roadway controller computer then creates a predictive model that describes a deterioration rate and future physical condition of the roadway based on the acquired sensor and location information and available environmental and traffic conditions for the roadway. The roadway controller computer then implements an amelioration action to reduce deterioration of the roadway that is predicted by the predictive model.

Other embodiments of the present invention include a computer program product and a computer system.

DETAILED DESCRIPTION

Figure 1:
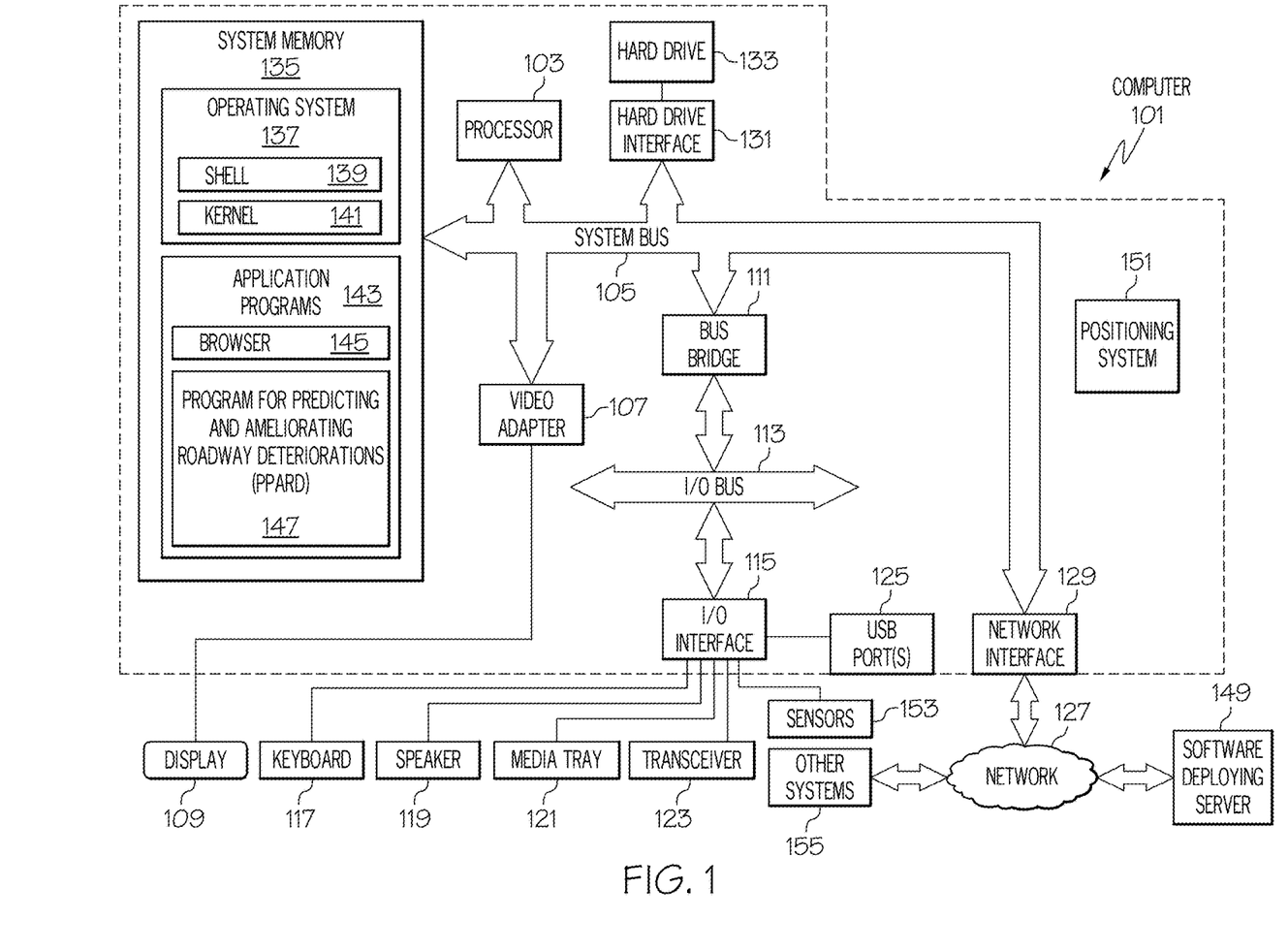
FIG. 1 depicts an exemplary system in accordance with one or more embodiments of the present invention.

With reference now to the figures, and in particular to FIG. 1, there is depicted a block diagram of an exemplary system and network in accordance with one or more embodiments of the present invention. Some or all of the exemplary architecture, including both depicted hardware and software, shown for and within computer 101 is utilized by software deploying server 149 and/or other systems 155 shown in FIG. 1, and/or roadway controller computer 201 and/or on-board computer 208 and/or amelioration computer 210 and/or cell phone 214 shown in FIG. 2.

Referring now to FIG. 1, exemplary computer 101 includes a processor 103 that is operably coupled to a system bus 105. Processor 103 may utilize one or more processors, each of which has one or more processor cores. A video adapter 107, which drives/supports a display 109 (which may be a touch screen capable of receiving touch inputs), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including (without limitation) a keyboard 117, a speaker 119, a media tray 121 (which may include storage devices such as CD-ROM drives, multi-media interfaces, etc.), a transceiver 123 (capable of transmitting and/or receiving electronic communication signals), and via external ports, such as USB port(s) 125. While the format of the ports connected to I/O interface 115 may be any known to those skilled in the art of computer architecture, in one or more embodiments, some or all of these ports are universal serial bus (USB) ports.

As depicted, network interface 129 is also coupled to system bus 105. Network interface 129 can be a hardware network interface, such as a network interface card (NIC), etc. Computer 101 is able to communicate with a software deploying server 149 and/or other systems 155 (e.g., establishing a wireless communication session between roadway controller computer 201 and vehicle 202 and/or vehicle 204 and/or on-board computer 208 and/or amelioration computer 210 and/or cell phone 214 shown in FIG. 2) via network interface 129 and network 127. Network 127 may include (without limitation) one or more external networks—such as a wide area network (WAN), and/or a network of networks such as the Internet—and/or one or more internal networks such as an Ethernet or a virtual private network (VPN). In one or more embodiments, network 127 includes a wireless network, such as a Wi-Fi network, and a cellular network. An example embodiment in a network "cloud" environment will be discussed with reference to FIGS. 4 and 5.

Referring again to FIG. 1, a hard drive interface 131 is also coupled to system bus 105. Hard drive interface 131 interfaces with a hard drive 133. In one embodiment, hard drive 133 is a non-volatile memory storing and populates system memory 135 (e.g., random access memory (RAM), which is also coupled to system bus 105. System memory can be considered a lowest level of volatile memory in computer 101. System memory 135 can include additional, higher levels of volatile memory (not shown), including, but not limited to, cache memory, registers and buffers. Data that populates system memory 135 includes computer 101's operating system (OS) 137 and application programs 143.

Operating system (OS) 137 includes a shell 139, for providing transparent user access to resources such as application programs 143. Generally, shell 139 is a program that provides an interpreter and an interface between the user and the OS. More specifically, shell 139 (sometimes referred to as a command processor) can execute commands entered into a command-line user interface or from a file. In other words, shell 139 can serve as a command interpreter. While shell 139 can be a text-based, line-oriented user interface, the present invention will equally well support other user interface modes, such as graphical, voice, gestural, etc. As depicted, shell 139, can be considered the highest level of an OS software hierarchy. The shell can also provide a system prompt, interpret commands entered by keyboard, mouse, or other user input media, and send the interpreted command(s) to the appropriate (e.g., lower) levels of the operating system (e.g., a kernel 141) for processing.

As depicted, OS 137 also includes kernel 141, which includes (hierarchically) lower levels of functionality for OS 137. A few (non-limiting) examples of kernel functions include: providing essential services required by other parts of OS 137 and application programs 143, including memory management, process and task management, disk management, and mouse and keyboard management.

Application programs 143 include a renderer, shown in exemplary manner as a browser 145. Browser 145 can include program modules and instructions (not depicted) enabling a world wide web (WWW) client (e.g., computer 101) to send to and receive network messages from network 127 (e.g., the Internet using hypertext transfer protocol (HTTP) messaging), thus enabling communication with software deploying server 149 and other systems 155.

In some embodiments, application programs 143 in computer 101's system memory include Program for Predicting and Ameliorating Roadway Deteriorations (PPARD) 147. In some embodiments, system memory 135 can be shared and/or application programs 143 distributed across one or more software deploying servers 149 or other systems 155. As depicted, PPARD 147 includes program instructions (software) adapted for implementing processes and/or functions in accordance with the present invention, such as those described with reference to FIGS. 2-3. In some embodiments, PPARD 147 is downloaded from software deploying server 149 (on-demand), or "just-in-time," wherein the software in PPARD 147 is not downloaded until needed for execution. In one embodiment of the present invention, software deploying server 149 performs all of the functions associated with the present invention (including execution of PPARD 147), thus freeing computer 101 from having to use its own internal computing resources to execute PPARD 147.

In some embodiments, computer 101 includes positioning system 151, which can determine a real-time current location of computer 101. Positioning system 151 may be a combination of accelerometers, speedometers, etc., or it may be a global positioning system (GPS) that utilizes space-based satellites to provide triangulated signals used to determine two-dimensional or three-dimensional locations.

In some embodiments, computer 101 is operably connected to one or more sensors 153, which can detect environmental conditions. More specifically, when sensors are configured to detect an environment associated with a vehicle (such as vehicle 202 shown in FIG. 2), sensors 153 are configured to detect road obstructions, pavement, etc., associated with the vehicle. For example, if computer 101 is on-board vehicle 202, then sensors 153 may be cameras, radar transceivers, etc. that allow the vehicle (including self-driving vehicles) to detect the associated environment (e.g., other vehicles, road obstructions, pavement, local weather conditions, etc.) of vehicle 202. A few other (non-limiting) examples of sensors 153 include cameras, thermometers, microphones, light sensors, chemical sensors, moisture detectors, etc. that detect ambient weather conditions, traffic conditions (as detected by the cameras, microphones, etc.), and other environmental conditions of a roadway upon which vehicle 202 is traveling.

The hardware elements depicted in computer 101 are not intended to be exhaustive, but rather are representative to highlight essential components required by the present invention. For instance, computer 101 may include alternate memory storage devices such as flash memory, magnetic cassettes, digital versatile disks (DVDs), Bernoulli cartridges, and the like. These and other variations are intended to be within the spirit and scope of the present invention.

Road imperfections such as potholes, cracks, protruding/sinking manhole covers, and flooded/icy areas present traffic hazards, and cause direct and indirect losses. By monitoring the road conditions using the novel techniques, sensors, devices, and/or analytics and predictive techniques described herein, the risks and losses may be reduced and the management of roadways by the appropriate authorities may be improved.

Some embodiments of the present invention include a collaborative system, using data from multiple sensors of various types and/or multiple passes over the same section of a road, evaluated by a common processing system, in order to monitor on a continuous basis the changing conditions of the road. Based on the resulting assessment, an avoidance and/or mitigation action (e.g. taking an alternate route, warning other road users, or reporting an actual or predicted hazard to the relevant authorities) may be implemented. By way of further (non-limiting) example, a dynamic and predictive analysis of changing road conditions may help the relevant authority better manage the roadway and the available maintenance resources. This approach is more efficient than prior art solutions that only alert drivers of hazards, road work, etc. Rather, some embodiments of the present invention may pro-actively ameliorate roadway conditions.

In one or more embodiments of the present invention, data from existing user-owned portable devices, such as cellular phones and GPS units, and vehicle on-board installed devices (both factory installed and retrofitted) is used to predict future surface conditions (e.g., potholes, deterioration, etc.) of a roadway. The variables measured may include acceleration, position, time, light conditions etc. The data is optionally pre-processed on the device itself, and sent to the controller unit(s).

Figure 2:
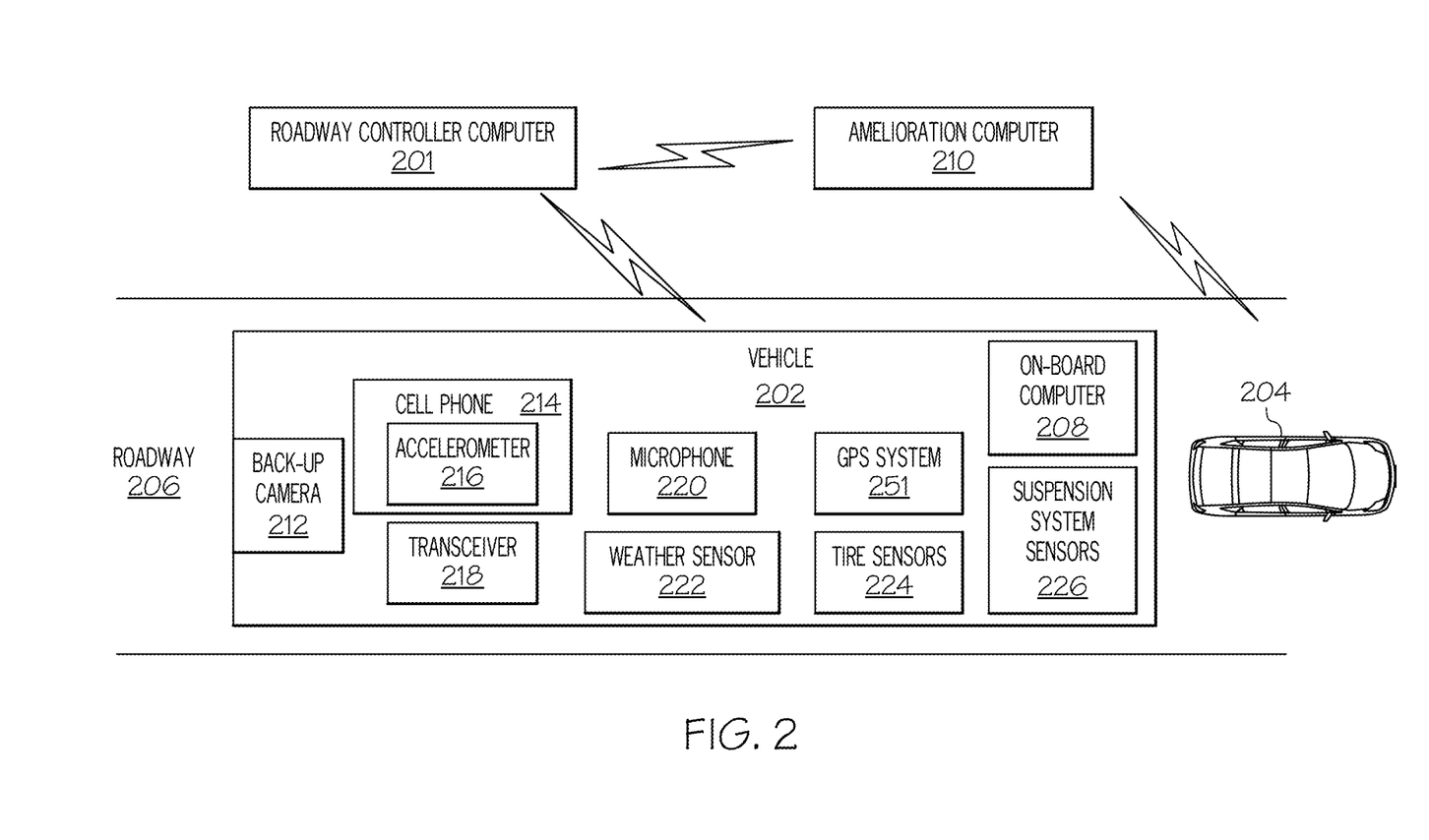
FIG. 2 illustrates an exemplary system in accordance with one or more embodiments of the present invention.

With reference now to the example depicted in FIG. 2, assume that a vehicle 202 is one of multiple vehicles (including vehicle 204) that are traveling along a certain section of a roadway 206. As depicted, vehicle 202 includes several sensors, including a camera 212 (e.g., a factory-installed backup camera) that may be configured to capture images of the surface of the roadway 206, local weather conditions, traffic conditions, etc. behind the vehicle 202, and which can be transmitted by transceiver 218 to a roadway controller computer 201, which may also aggregate/consolidate/process the images from vehicle 202 with images from one or more other vehicles (e.g., vehicle 204).

Further, a passenger/driver in the vehicle 202 may be carrying a cell phone 214, which has a built-in accelerometer 216. In some embodiments, vehicle 202 may separately incorporate an accelerometer (or similar device). The accelerometer can be configured to detect movements of the vehicle 202, including sudden movements that result from hitting a pothole or rough surface on the roadway 206, and generate data that describes such movement. The cell phone 214 may then transmit this data (either with or without preprocessing that identifies the type of roadway condition that caused the motion) to roadway controller computer 201, which then may aggregate/consolidate/process such data with data from other vehicles (e.g., vehicle 204).

On-board computer 208 on the vehicle 202 may also pre-process data from the cell phone 214 and/or other sensors that are actually part of the vehicle 202. That is, also on the vehicle 202 may be a microphone 220, a weather sensor 222, a GPS system 251, tire sensors 224, etc.

The microphone 220 is able to pick up road noise that is indicative of rough roads, hitting a pothole, etc. on the roadway 208.

The weather sensor 222 may be a thermometer, moisture detector, etc. that senses the temperature, wetness, etc. of the roadway 208.

The GPS system 251 identifies the exact location on the roadway 206 at which various (roadway condition) sensor readings are taken.

Tire sensors 224 may be pressure sensors within the tires on the vehicle 202, which detect a spike in pressure when the vehicle 202 hits a pothole, a rhythmic change in tire pressure as the vehicle 202 travels over rough areas on the roadway, etc. The tire sensors 224 may also be cameras that are aimed at the tires on the vehicle 202, thus capturing both movement of the tires as well as roadway conditions of roadway 206. Tire sensors 224 may be microphones that are integrated into the tire rims of vehicle 202, in order to detect noise patterns related to driving over road irregularities.

The on-board computer 208 may analyze and/or pre-process some or all of the sensor data from sensors on vehicle 202 in order to identify the surface conditions of the roadway 206. That is, as described herein, data analytics may compare the sensor readings to known data in order to indicate the presence of potholes on roadway 206, rough surfaces on roadway 206, ice and/or water on roadway 206, etc.

User-owned portable devices, such as cellular phones 214 and GPS systems 251, as well as affixed devices such camera 212, provide accelerometric, positional (based on GPS or cell triangulation) and light conditions data.

Sensors in the vehicle's suspension (e.g., suspension system sensors 226) measure up and down movement of the suspension on the vehicle 202, thus providing an indication of surface conditions of roadway 206.

Controller unit(s) (not depicted), may be implemented locally on one or more device(s), (e.g. cellular phones 214 and GPS systems 251), to collect, process and evaluate collected data. The controller unit(s) (e.g., on-board computer 208) may coordinate sensor readings from various sensors (e.g., microphone 220, tire sensors 224, etc.) on the vehicle 202. In some embodiments, the controller unit(s) may share data with other controller units, to facilitate a collaborative evaluation in a network environment.

For example, a network of controller units may enable individual controllers to benefit from data collected by other devices at different times over the same section of road. Thus, a collective evaluation of road conditions over time can be facilitated. That is, a collaboration between real-time sensor readings generated by vehicles 202/204, historical roadway conditions stored in the roadway controller computer 201 and/or the amelioration computer 210, and communications among the vehicle 202, vehicle 204, roadway controller computer 201, and/or amelioration computer 210 provide the ability to 1) predict a future condition of the roadway 206 and 2) take ameliorative actions to reduce the deterioration of the roadway 206.

The network may also improve reliability of the data. Referring again to the example in FIG. 2, such a controller unit network may include roadway controller computer 201 and/or on-board computer 208.

Some embodiments of the present invention include a collective aspect of processing the data. Any information based on data measured on a single vehicle (e.g., vehicle 204) passing once through a section of a road can be unreliable, since conditions of the road can change, due to temporary factors such as presence of movable debris and water/ice, and minor changes of the trajectory of a vehicle inside a travel lane. Collecting and processing data from multiple vehicles (e.g., vehicle 202, vehicle 204 plus numerous other vehicles, not shown in FIG. 2), and/or multiple passes by the same vehicle(s) over the same road section promotes the exclusion of variable aspects and the extraction of more reliable information about road conditions.

Thus, one or more embodiments of the present invention use a collaborative evaluation to increase the reliability of the data by collecting data from multiple vehicles, and/or multiple passes over the same road section. Some embodiments further apply advanced machine learning techniques to such data along with information from multiple vehicles' trajectories and drivers' reactions. Such information, which can appear to be different/unrelated at an independent, observation level (e.g. braking/deceleration versus swerving/lateral acceleration versus driving through a depression/vertical acceleration), can (collectively) point to a common underlying cause (e.g. a road depression) as causing the observed data features. In some embodiments, the present invention uses data collected from multiple vehicles to generate an improved confidence in road conditions.

By way of example only, a collaborative evaluation may be used to:

a) warn drivers about the approaching road imperfections, both local ("deep pothole in the left lane") and extended over a section of a road ("uneven road surface for the next 1 mile");

b) adjust the routes created by vehicle GPS devices to avoid affected road section(s); and/or c) report issues to the authorities responsible for maintaining the road infrastructure.

Some embodiments of the present invention include an analytics component (e.g., enabled by executing PPARD 147 within roadway controller computer 201) that can provide useful diagnostic and predictive information that may be used by the managing authorities to better schedule repairs of the roadways as well as to take proactive actions to avoid possibly dangerous conditions for drivers. Especially in highly trafficked roads in areas with severe weather conditions (like certain cold and wet areas of the country), potholes are a common occurrence and may lead to accidents or damage to vehicles. Different roads have different characteristics and on some, potholes may quickly become more dangerous than on others. The authorities in charge of maintaining roadways need to schedule repairs keeping in mind cost, disruption to traffic, and danger to drivers. Historical information on the evolution of potholes may be used as an input to the analytical component of PPARD 147 to build road-section-specific models that predict the evolution of the pothole based on new observations. Such data may be combined with traffic information to efficiently schedule repairs and to make better use of the available resources. For example, a slowly-evolving pothole may be dealt with when resources become available and the repair may be scheduled at a time that is least disruptive for commuters; a quickly-evolving pothole on a high traffic road might require a more immediate set of actions, including lane closures, preparation of alternative routes and deployment of signs to direct drivers, and public announcements.

As the data produced by the measuring devices is affected by various sources of noise, advanced signal processing is used to analyze it. The analysis may include both preliminary pre-processing steps such as noise removal as well as more complicated processing evaluations, such as resolving the position of the accelerometer-equipped device in the moving vehicle in order to convert the raw accelerometric data into a 3-axis accelerometric profile.

Examples of signal processing techniques that may be used to analyze sensor readings (in order to determine roadway conditions) include, but are not limited to, analog signal processing that utilizes various types of hardware and/or software filters, continuous-time signal processing that utilizes time/frequency domain processing, discrete-time signal processing applied to sampled signals from the sensors on the vehicle, digital signal processing that is performed by application specific integrated circuits (ASICs) designed to implement various transform algorithms (e.g., FFT, FIR, IIR, etc.) to quantify/qualify the sensor readings from the sensors on the vehicle, nonlinear signal processing, etc.

Higher level data evaluation, based on acceleration, position etc. data, is used to identify features needed to access the road conditions.

For example, if a depressed manhole cover or a pothole appears in the road, some drivers (or a driver on several trips through the same area) may drive through the depression, generating data with a pattern of abrupt vertical accelerations, while others (or the same driver on other occasion(s)) may avoid the depression, generating data with a pattern of more gradual lateral accelerations, while yet another driver(s) may reduce the speed of the vehicle when observing the hazard, which will result in data showing longitudinal deceleration and acceleration. Data preprocessing allows the system to identify the condition of the depressed manhole cover by factoring in (e.g., weighting) various data that describes the current driver's driving profile/history, etc.

Data preprocessing may also involve the detection of the type of hazard. Different types of hazards will have different signatures from the sensors. Depressed manhole covers and potholes will produce signals compatible with a bumpy ride in the cabin. Likewise, flooding may lead to aquaplaning. However, before a vehicle actually aquaplanes, a partially flooded road may produce sudden lateral acceleration as well as forward deceleration on the car. Aquaplaning and icing conditions may lead to loss of traction (which may be detected by a traction control system on the vehicle), where the direction of motion is different from the direction in which the car is pointing. Differentiating between aquaplaning and skidding on ice is easily determined by the system if the weather conditions (i.e., wet or freezing) are known.

Many of these evaluation steps may deploy techniques based on machine learning, e.g. using large data sets to establish models used in the detection of various characteristics of the data.

In some embodiments, information from parking cameras (e.g., camera 212) and sensors (e.g., tire sensors 224, suspension system sensors 226, etc.) may also be collected by a local processing unit (e.g., on-board computer 208) associated with vehicle 202. Information (e.g., from cell phone accelerometer 216 or a vehicle sensor such as camera 212) may also be received by and processed and/or shared from cell phone 214. Such local processing may establish a local collaborative network with similar units from other cars (e.g., between vehicle 202 and vehicle 204 either directly or via roadway controller computer 201). The collaborative network may be used to perform local processing of the data, such as filtering and compressing the information before sending it to a central database. Filtering and compressing may include, for example, gathering the information from all cars in the lane where the hazard is located, gathering the information from the cars in the other lanes, summarizing the information from lanes where there is no hazard, and providing detailed information only on the lane where the hazard is located. In case of rapidly evolving conditions (e.g., flooding and icing), the local processing may include comparing the information from the database with the current conditions and producing signals (e.g., an urgent alert) when it becomes apparent that the situation is rapidly deteriorating from what is stored in the database. A machine learning classifier or techniques such as collaborative filtering may be trained for these purposes.

The irregularity detection component (e.g., a combination of sensors from vehicles 202/204 and roadway controller computer 201) sends the information to another component (e.g., amelioration computer 210 shown in FIG. 2) which waits to listen to these triggers. Once received, amelioration computer 210 uploads the information (using the car's in-built WIFI) to a central database. This database may be accessed by the roadway managing authority or by users that are subscribed to a service.

In an embodiment of the present invention, one or more processors (e.g., within cell phone 214, or within on-board computer 208, or within roadway controller computer 201) preprocess the sensor and location information to establish an average description of the physical driving surface conditions of the roadway. That is, each time vehicle 202 runs over a certain pothole, it creates a record of doing so. Thus, the on-board computer 208 on vehicle 202 is able to "smooth out" the sensor readings in order to generate an "average" description of the depth, shape, etc. of the pothole. Likewise, the roadway controller computer 201 (or a collaboration of the on-board computers 208 within vehicle 202 and vehicle 204) may establish an average description of the pothole by "smoothing out" the sensor data.

In an embodiment of the present invention, the sensor and location information is generated by a plurality of sensors, which may be from a same vehicle or may be from different vehicles traveling over a particular area on the roadway. In this embodiment, one or more processors (e.g., within on-board computer 208) train the plurality of sensors to automatically collect and transmit sensor and location information to the roadway controller computer in response to sensor readings from the plurality of sensors exceeding predefined limits that are indicative of a degraded roadway. For example, every time tire sensors 224 receive an impact that is beyond a certain level of amplitude (as a result of hitting a pothole), the on-board computer 208 will capture the received sensor readings from the tire sensors 224.

One aspect of the present invention uses predictive models to assess how quickly the roadway condition might evolve. Predictive models for time-series is known in the art. Some embodiments of the present invention reflect a variety of factors that can affect the evolution of road hazards, including traffic, weather conditions, the presence of de-icing material on the road, etc. Thus, in one or more embodiments of the present invention, a modeling framework consists of two components: a predictive component that forecasts how the signals from the vehicles will evolve over time given the observed signals and additional extrinsic information such as traffic conditions, weather conditions, etc.; and an assessment component that uses historical observations to correlate the observed signals with the magnitude of the problem, where the magnitude of the problem is measured in whatever scale the roadway managing authority feels appropriate. Both models may be learned using standard techniques. Combining these models provides the roadway managing authority with a predictive model that yields predictions in the form that the managing authority can ameliorate the detected roadway condition.

Figure 3:
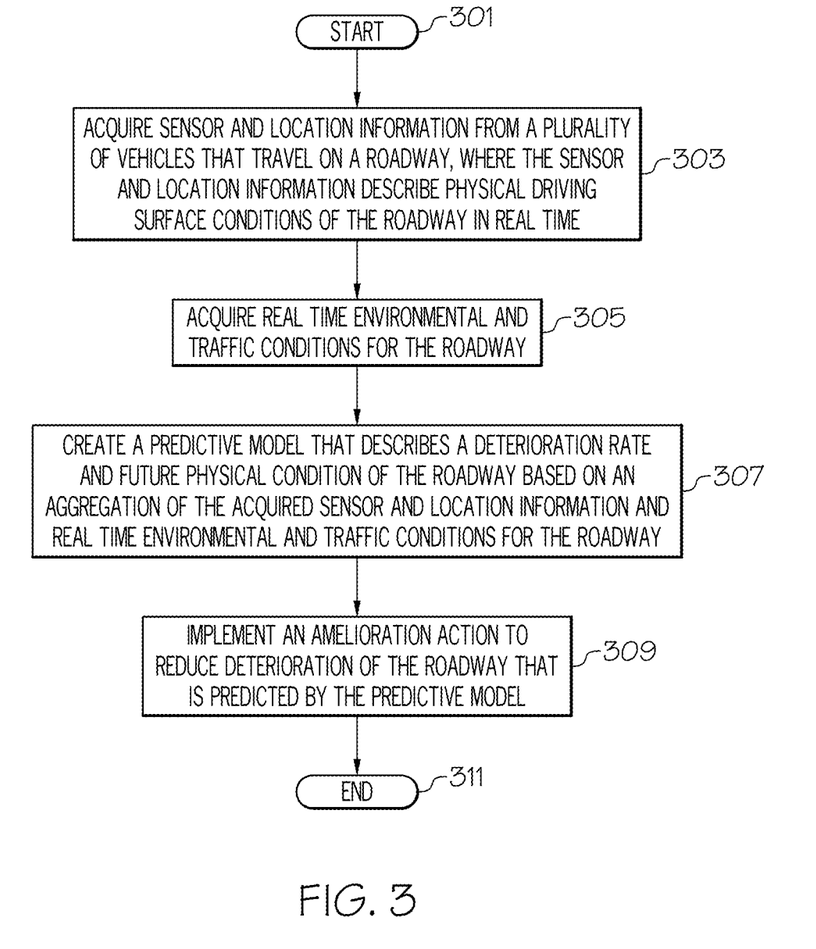
FIG. 3 is a high-level flow chart illustrating a process in accordance with one or more embodiments of the present invention.

With reference now to FIG. 3, a high-level flow chart illustrating a process in accordance with one or more embodiments of the present invention is presented.

As depicted, after initiator (start) block 301, in block 303, a roadway controller (e.g., roadway controller computer 201 shown in FIG. 2) acquires sensor and location information from a plurality of vehicles (e.g., vehicle 202 and vehicle 204) that travel on a roadway. This sensor and location information, which can come from sensors such as accelerometer 216, tire sensors 224, etc., describes physical driving surface conditions of the roadway in real-time. In some embodiments, the sensor and location information may be generated by and transmitted from smart phones being transported in the plurality of vehicles, or it may be generated by sensors that are affixed to the plurality of vehicles.

In block 305, the roadway controller also acquires real-time environmental and traffic conditions for the roadway (e.g., from camera 212, weather sensor 222, etc.).

In block 307, the roadway controller then creates a predictive model that describes a deterioration rate and future physical condition of the roadway based on an aggregation of the acquired sensor and location information and real time environmental and traffic conditions for the roadway. In other words, the roadway controller may use collaboratively collected sensor information, location information environmental information, and traffic conditions for a particular place on the roadway 206 to create a predictive model of the deterioration rate and future condition of the roadway. Thus, the roadway controller is able to receive sensor readings that describe the current condition of the roadway at a particular place (e.g., a location of a pothole). Based on historical records regarding how such a pothole will impact the future condition of the roadway (e.g., depth of the pothole), a prediction of the state of that pothole may be ascertained.

For example, assume that historical records show that if a pothole is three inches deep, and that 100 cars a day run over the pothole, then the pothole will be six inches deep after another month. This prediction can be further based on weather conditions, etc. The depth and shape and size of the pothole can be ascertained by sensor readings (e.g., from the aforementioned cell phone and/or vehicle sensors). By using multiple sensor readings from multiple vehicles (or multiple vehicle passes over the same location), a more accurate description of the state of the pothole is ascertained.

Returning now to FIG. 3, in block 309, the roadway controller recommends implementation of an amelioration action (e.g., to reduce deterioration of the roadway predicted by the predictive model). For example, with reference also to FIG. 2 the roadway controller computer 201 may communicate with the amelioration computer 210 (which may be the same computer as the roadway controller computer 201 or may be a different computer) to recommend implementation of one or more steps designed to reduce deterioration of the roadway.

For example, the amelioration 210 computer may contact a traffic routing server (e.g., which provides real-time travel instructions/recommendations to GPS-based navigation systems other vehicles) to provide awareness of the condition and/or recommend that vehicles take an alternate route, thus reducing wear and tear on the area of the roadway that is being degraded. In another example, the amelioration computer may issue a work order to a work crew to repair the roadway (e.g., fill in a pothole).

The process proceeds to and ends at terminator (end) block 311.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
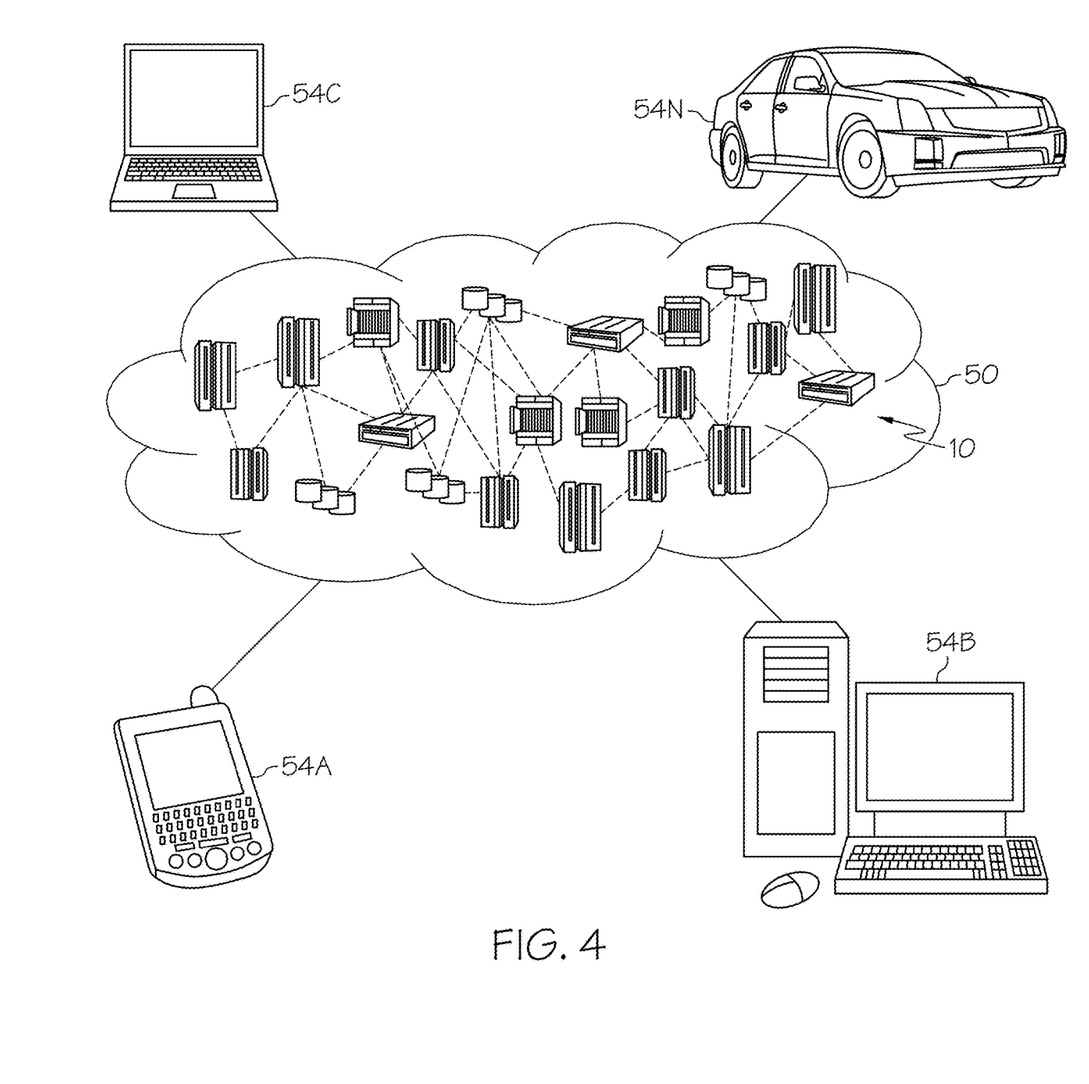
FIG. 4 depicts a cloud computing environment according to an embodiment of the present invention.

Referring now to FIG. 4, an illustrative cloud computing environment 50 is depicted. As shown, cloud computing environment 50 comprises one or more cloud computing nodes 10 e.g., roadway controller 201 (FIG. 2), with which local computing devices used by cloud consumers, such as, for example, personal digital assistant (PDA) or cellular telephone 54A, desktop computer 54B, laptop computer 54C, and/or automobile computer system 54N (such as computer 101 (FIG. 1) or on-board computer 208 (FIG. 2)) may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 4 are intended to be illustrative only and that computing nodes 10 and cloud computing environment 50 can communicate with any type of computerized device over any type of network and/or network addressable connection (e.g., using a web browser).

Figure 5:
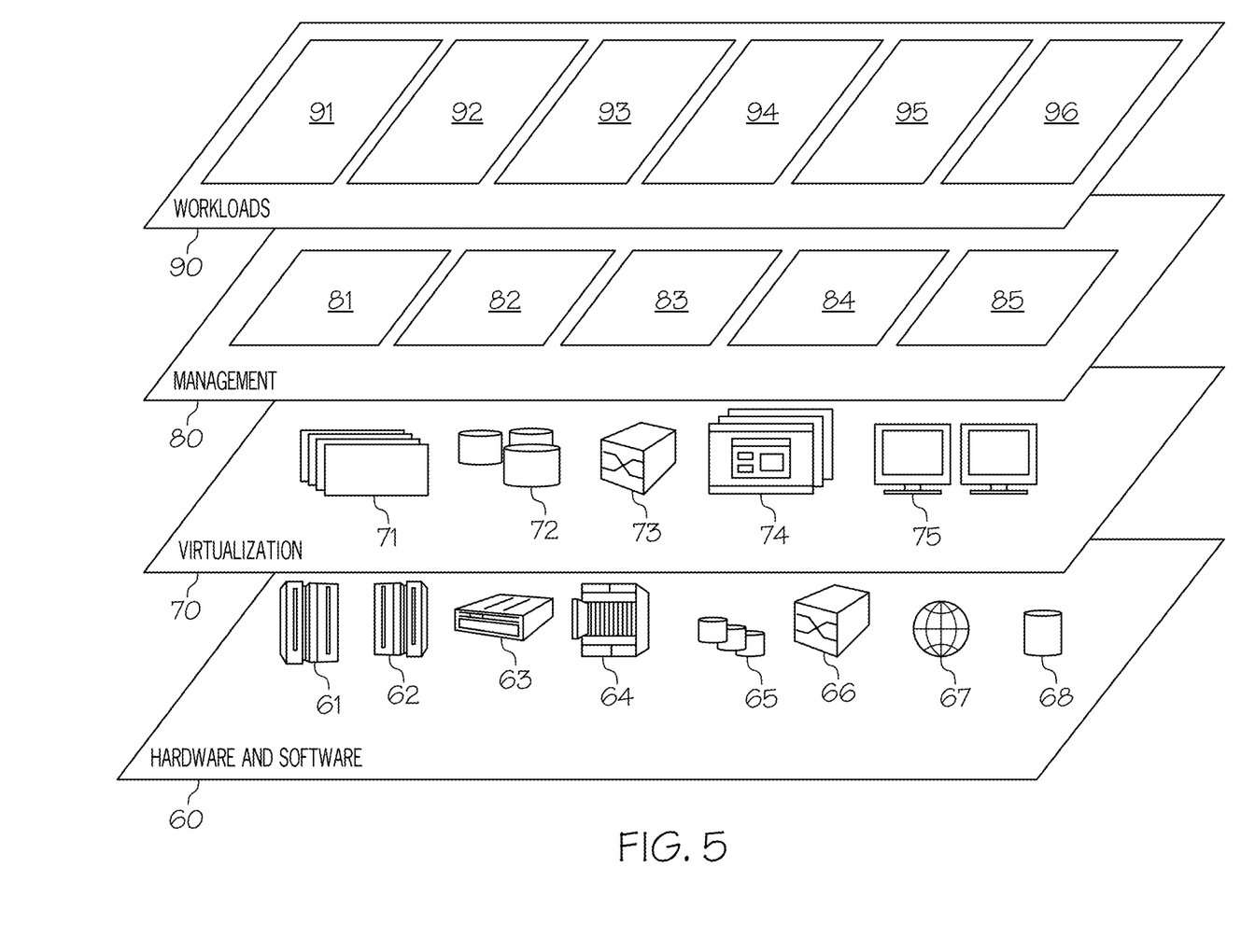
FIG. 5 depicts abstraction model layers of a cloud computing environment according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and roadway condition prediction and processing 96 in accordance with one or more embodiments of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
   acquiring, by a roadway controller computer, sensor and location information, wherein the sensor and location information describe physical driving surface conditions of a roadway, wherein the sensor and location information is generated by pressure sensors within tires of a plurality of vehicles that are traveling on the roadway;

creating, by the roadway controller computer, a predictive model that describes a deterioration rate and future physical condition of the roadway based on acquired sensor and location information generated by the pressure sensors within the tires of the plurality of vehicles that are traveling on the roadway;

comparing information in the predictive model to a database of previous information that describes a level of deterioration of the roadway;

determining that the information in the predictive model is different from the previous information in the database that describes the level of deterioration of the roadway;

determining that the roadway is flooding based on the information in the predictive model being different from the previous information in the database that describes the level of deterioration of the roadway; and implementing an amelioration action to reduce deterioration of the roadway based on determining that the roadway flooding.

2. The computer-implemented method of claim 1, wherein the amelioration action is directing vehicular on-board navigation systems to reroute vehicular traffic in order to reduce an amount of vehicular traffic on the roadway.

3. The computer-implemented method of claim 1, wherein the amelioration action is performing preventive maintenance on the roadway.

4. The computer-implemented method of claim 1, wherein the sensor and location information is further generated by and transmitted from accelerometers within smart phones being transported in a plurality of vehicles that are traveling on the roadway.

5. The computer-implemented method of claim 1, wherein the sensor and location information is further generated by sensors that are affixed to the plurality of vehicles that are traveling on the roadway.

6. The computer-implemented method of claim 1, further comprising:
pre-processing, by the roadway controller computer, the sensor and location information to establish an average description of the physical driving surface conditions of the roadway.

7. The computer-implemented method of claim 1, further comprising:
training, by one or more processors, the pressure sensors to automatically capture the sensor and location information to the roadway controller computer in response to sensor readings from the pressure sensors exceeding predefined limits that are indicative of a degraded roadway.

8. A computer implemented method comprising:
acquiring, by a roadway controller computer, sensor and location information from sensors on a plurality of vehicles traveling on a roadway, wherein the sensor and location information indicate a presence and location of a pothole on the roadway;
determining different pothole measurements of a depth and shape of the pothole based on the sensor and location information from the sensors on the plurality of vehicles traveling on the roadway;
generating a description of the depth and shape of the pothole by smoothing out the sensor and location data from the sensors on the plurality of vehicles in order to generate an average description of the depth and shape of the pothole;
creating, by the roadway controller computer, a predictive model that describes a deterioration rate and future physical condition of the roadway based on the average description of the depth and shape of the pothole; and
implementing an amelioration action on the pothole in order to reduce deterioration of the roadway as caused by the pothole, wherein the amelioration action is based on the predictive model.

9. A computer-implemented method comprising:
acquiring, by a roadway controller computer, sensor and location information from sensors on a plurality of vehicles that are traveling on a roadway, wherein the sensor and location information describe a current physical condition and location of a depressed manhole cover on the roadway, wherein the depressed manhole cover is below a surface of the roadway, and wherein the sensor and location information is generated by the sensors as each of the plurality of vehicles reach the depressed manhole cover on the roadway;
receiving driver data information that describes past multiple driver reactions to driving over the depressed manhole cover on the roadway, wherein the past multiple driver reactions adjusted movements of the multiple vehicles when reaching the depressed manhole cover;
determining a current physical condition of the depressed manhole cover based on the the sensor and location information from the sensors on the plurality of vehicles that are traveling on a roadway and the driver data information that describes the past multiple driver reactions;
creating, by the roadway controller computer, a predictive model that describes a deterioration rate and future physical condition of the roadway based on acquired sensor and location information that describes the current physical condition and location of the depressed manhole cover; and
implementing an amelioration action to reduce deterioration of the roadway that is predicted by the predictive model.

10. The computer-implemented method of claim 1, wherein the sensor and location information is further generated by sensors in suspensions of the plurality of vehicles that are traveling on the roadway, and wherein the sensors in the suspensions measure up and down movement in the suspensions that is caused by the physical surface conditions of the roadway.

11. The computer-implemented method of claim 1, further comprising:
detecting a predefined quantity of vehicles running over a pothole in the roadway during a predefined amount of time; and
adjusting the predictive model based on the predefined quantity of vehicles running over the pothole in the roadway during the predefined amount of time.

12. The computer-implemented method of claim 1, further comprising:
further generating, by microphones within smart phones being transported in the plurality of vehicles that are traveling on the roadway, the sensor and location information, wherein the microphones detect sounds that correspond to the physical driving surface conditions of the roadway.

* * * * *